United States Patent

[11] 3,607,647

[72] Inventors Peter Hidi
Kingsgrove, New South Wales;
Ian G. R. Burgess, Warrawee, New South Wales; Robin H. Holdgate, Wahroonga, New South Wales, all of Australia

[21] Appl. No. 631,888
[22] Filed Apr. 19, 1967
[45] Patented Sept. 21, 1971
[73] Assignee The Colonial Sugar Refining Company Limited
Sydney, New South Wales, Australia

[54] TREATMENT OF SUGAR SOLUTIONS
7 Claims, No Drawings

[52] U.S. Cl. .......... 195/11, 195/7
[51] Int. Cl. .......... C13d 3/00
[50] Field of Search .......... 195/2, 7, 11, 17, 31; 99/141, 142; 127/30, 34, 40, 46

[56] References Cited

UNITED STATES PATENTS 2,280,085 4/1942 Ventre et al. .......... 195/11 X

OTHER REFERENCES

Niholson et al., International Sugar Journal V60 p 260–263 (1958)

Reed et al., Enzymes in food Processing p 50–59 Acidemic Press, New York, N.Y. 1966

Pigman, Ward, The Carbohydrates pages 502-503 Academic Press, New York, 1957

*Primary Examiner*—Lionel M. Shapiro
*Attorneys*—Emory L. Groff and Emory L. Groff, Jr.

ABSTRACT: Process for reducing the starch level of a starch-containing sucrose solution derived from sugar-bearing plant material, for example, a mill-clarified liquor or a refinery syrup, in which a thermostable bacterial amylase, such as one having $\alpha$-amylase activity and being derived from the species Bacillus subtilis, is added to the solution at a temperature between 160° F. and the deactivation temperature of the amylase, the pH of the solution being neutral to slightly alkaline.

TREATMENT OF SUGAR SOLUTIONS

Starch has been found to impede the filtration of sugar solutions. In prior attempts to reduce the starch content of sugar solutions, it has been proposed variously to breed low-starch-content canes, to extract the juice from the canes by diffusion (rather than by crushing) or to use low temperatures during maceration. It has also been proposed to reduce the starch content of extracted juice by employing cold juice filtration or high-speed centrifugation or by the use of thermolabile enzymes derived from malt or fungi.

However, all these prior processes have suffered from major deficiencies, as a result of which none has been adopted in standard industrial practice. In particular, the known treatment with thermolabile enzymes has required the use of temperatures below 160° F. and pH values less than 7. At such temperatures, starch which has not been heated previously above 160° F. exists in a granular form resistant to enzyme attack; and at such pH values, sucrose inversion is liable to occur.

The main object of the present invention is to provide a simple, cheap and efficient process of improving the refining quality of sugar solutions. Particular objects of the invention are to improve the filterability of a sugar solution, the increase the optical clarity of the filtered solution, and to lower the viscosity of the solution whereby to improve the "exhaustibility" of resultant molasses.

In accordance with the invention these objects are achieved as a result of reducing the starch level of starch-containing sucrose solution by adding to the solution at least one thermostable bacterial amylase, the temperature of the solution being above 160° F. but below the deactivation temperature of the amylase. The rate of reaction increases rapidly with increase of temperature, and temperatures above 175° F. are preferred.

It will be appreciated that the deactivation temperature of an amylase is not sharply defined and that a practical upper limit for given requirements may readily be determined by experiment. The amylases which are subject of the invention are active at elevates temperatures (e.g. 190° F.) where the starch destruction rate is high.

Starch destruction rates achieved by the present invention are very much greater than those achieved by prior methods using thermolabile amylases. Correspondingly, the amount of amylase required and the reaction time are very much reduced. Two effects are responsible for this improvement, (i) acceleration of destruction rate due to increased temperature, (ii) the fact that at temperatures above 160° F., starch exists in solution in a colloidal form particularly susceptible to enzymatic attack.

A further advantage of the present invention is that bacterial amylases tolerate conditions of pH (neutral to slightly alkaline) where inversion does not occur.

Preferred amylases are those possessing mainly $\alpha$-amylase activity. Such amylases are effect against both the branched as well as the linear fractions of starch, converting it to the following products: glucose medium polymers, maltose and glucose. When $\beta$-amylases are used, action is blocked at points of branching in the starch molecule and the products are essentially: high molecular weight dextrin and maltose.

Amylases especially favored for use in the invention are derived from the species *Bacillus subtilis*. These are nonpathogenic and are readily available.

The amount of amylase required in a given case varies according to the activity of the amylase preparation, the starch level obtaining in the sugar solution and the required degree of starch removal. In the case of most commercial amylase preparations and in the case of most naturally occurring starch levels in sugar solutions, quantities of amylase preparation normally used vary between 5 to 750 parts per million (by weight) based on sucrose. The amylase is added as a solution, slurry or in powder form and is mixed thoroughly with the solution.

It is an additional advantage of the invention that required conditions for enzymatic starch destruction do not entail major deviations from the conventional sugar manufacturing process.

Usually, the selected amylase can be added to one of the normal process streams of the sugar manufacturing process; however, it may be desirable to install holding vessels in certain cases.

It has been found that the most suitable place for introducing the amylase into the sugar solution is in the third or fourth evaporator vessels after the mill clarification process for the preparation of raw sugar. At these points, the temperature of the solution is about 180° F., the pH lies within the range about 6.7 to about 8.2 (i.e. the optimum pH range for bacterial amylase activity), and vigorous boiling (under reduced pressure) within the vessels ensures that the amylase is thoroughly mixed with the solution.

Experiments have shown that under these conditions, a reaction time as little as 5 minutes is sufficient to remove 30–80 percent of the starch occurring in normal raw sugar mill process streams.

Reaction times other than 5 minutes are of course within the scope of the invention and it will be understood that the amylase can be introduced alternatively at other stages in the sugar manufacturing process.

The invention is applicable to removing starch from sugar solutions not only during mill processing but also during subsequent refining. In the latter situation temperatures of 180° F. are again normal and the pH lies usually within the range about 7.5 to about 8.5, i.e. the conditions are not suitable for reducing the starch level by employing prior art thermolabile amylases derived, e.g. from malt. In addition, these amylases do not work effectively at the high sugar concentrations (about 55 to 70 Brix) which normally occur in refinery syrups, nor is the retrograded starch occurring therein susceptible to attack by them.

The present invention overcomes these disadvantages and permits successful reduction of the starch level in the refinery situation.

The bacterial amylases selected for use in the practice of the invention are of course not invertase-active, and it is a further advantage of this new process that it does not entail a detectable loss of sucrose.

The following examples illustrate applications of this process.

EXAMPLE 1

A cane with a high starch content known as variety N.Co 310 was crushed, and the juice clarified in a pilot plant, according to the usual procedure. After separation from mud, the hot clear liquor was divided into two portions (each 20 lb). A bacterial amylase preparation known under the trade name "Rapidase" (300 mg.) was added to one portion of the liquor when the temperature had dropped below 180° F., and stirred in thoroughly. The mixture was transferred to an evaporator vessel and sugar was boiled from the liquor in an experimental pan. As a control the second portion of juice was treated in exactly the same way, but without the addition of amylase. Results are recorded in table 1.

TABLE 1

| | Treated | Control |
|---|---|---|
| Starch in clarified liquor (a) | 154 | 920 |
| Starch in crystallized sugar (b) | 60 | 440 |
| Starch in residual A-syrup (c) | 445 | 1,870 |
| Filterability of sugar, % (d) | 47 | 27 |

(a) parts per million by weight based on solids in liquor.
(b) parts per million by weight.
(c) parts per million by weight based on solids in syrup.
(d) filterability expresses the filtration rate compared with that of refined sugar under conditions standardized to correlate with refinery performance.

NOTES:

(n) parts per million by weight (o) parts per million based on solids content (p) expressed as the optical density, in a 4 cm cell, of the solution filtered through a 0.3 μ-Millipore membrane under standard conditions and measured against a blank of distilled water at a wave length of 5,600 A.

(q) expressed as the optical density in a 4 cm cell, of the unfiltered solution measured against a blank of the filtered solution (filtration as defined in (p) above) at a wave length of 5,600 A.

Example 7

"Super Rapidase" amylase preparation was introduced to the fourth evaporator vessel of a mill noted for a normal production of high starch raw sugar. The addition was made during a period of one week at the rate of 100 parts by weight of amylase per million parts by weight of sugar. The starch level of the raw sugar was progressively reduced as the effects of the amylase spread through the intermediate mill process materials, and the filtration performance of the sugar improved correspondingly. The filtration performance of raw sugar made at this mill during the trail week was separately assessed at a carbonatation refinery under carefully controlled constant conditions Results are recorded in Table 6.

After the addition of amylase was terminated, the filtration performance of the raw sugar deteriorated again as the starch level increased to the pretrail value.

TABLE 6

| Day (r) | Starch in raw sugar (s) | Slurry resistance $cm^3g^{11}sec^{11}10^7$ (t) |
|---|---|---|
| 1 | 590 | 7.4 |
| 2 | 480 | 3.1 |
| 3 | 400 | 1.7 |
| 4 | 330 | 2.6 |
| 5 | 260 | 1.2 |

(r) of the trial week.
(s) parts per million by weight.
(t) of the carbonated raw liquor.

Examples 5–6 and 4 show the significant improvements can be achieved in the refinery performance of raw sugars by treating the raw sugar (respectively) during refining or under laboratory conditions similar to those obtaining in a refinery. The high heat stability of the applied amylases permits some starch removal in the melter and storage tanks of the refinery without any significant alteration in the refining process. These examples also show the high degree of the improvement obtained by a merely fractional starch removal. A comparison of the reduction in starch content and improvement in filterability from process liquors of both a mill and a refinery indicates that the amylase treatment is more effective in the mill (where a practical maximum of 80 percent starch reduction may be achieved) than it is in the refinery (where a practical maximum of 50 percent starch reduction may be achieved). Reasons for this are partly related to difficulty to the amylase in attacking the retrograded starch present in the refinery syrups.

What is claimed is:

1. A process for reducing the starch level of a starch-containing sucrose solution derived from a sugar cane comprising the step of adding to the solution at least one thermostable bacterial amylase, the temperature of the solution being above 160° F. but below the deactivation temperature of the amylase and the pH of the solution being slightly neutral to slightly alkaline thereby improving the filterability of said solution, increasing the optical clarity of the filtered solution and lowering the viscosity of the solution.

2. A process according to claim 1 wherein said thermostable bacterial amylase has α- activity and is derived from the species *Bacillus subtilis*.

3. A process according to claim 1 wherein said temperature of the solution is above 175° F.

4. A process according to claim 1 applied to a starch-containing sucrose-containing sucrose solution which is an intermediate product in the preparation of refined sugar from said sugar cane.

5. A process according to claim 4 wherein the solution is a mill-clarified liquor.

6. A process corresponding to claim 5 applied to the mill-clarified liquor contained in a vessel selected from the group consisting of the third and fourth evaporator vessels of a mill.

7. A process according to claim 4 wherein the solution is a refinery syrup.